(12) United States Patent
Lang et al.

(10) Patent No.: US 10,378,818 B2
(45) Date of Patent: Aug. 13, 2019

(54) PROCESS FOR PRODUCING AND PURIFYING A SYNTHESIS GAS

(71) Applicant: LINDE AKTIENGESELLSCHAFT, Munich (DE)

(72) Inventors: Martin Lang, München (DE);
Christian Voss, Geretsried (DE);
Benedikt Schürer, München (DE);
Gabriel Salazar Duarte, München (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/114,436

(22) PCT Filed: Jan. 29, 2015

(86) PCT No.: PCT/EP2015/000170
§ 371 (c)(1),
(2) Date: Jul. 27, 2016

(87) PCT Pub. No.: WO2015/117737
PCT Pub. Date: Aug. 13, 2015

(65) Prior Publication Data
US 2016/0341472 A1    Nov. 24, 2016

(30) Foreign Application Priority Data

Feb. 4, 2014  (EP) ..................... 14000398

(51) Int. Cl.
B01D 53/00    (2006.01)
B01D 53/04    (2006.01)
(Continued)

(52) U.S. Cl.
CPC .......... *F25J 3/0261* (2013.01); *B01D 53/002* (2013.01); *B01D 53/0438* (2013.01);
(Continued)

(58) Field of Classification Search
CPC .......... Y02P 20/152; C10G 2300/1022; B01D 2257/504; B01D 53/75; B01D 2259/4141;
(Continued)

(56) References Cited

U.S. PATENT DOCUMENTS 4,566,886 A     1/1986  Fabian et al.
8,128,735 B1 *  3/2012  Siriwardane ....... B01D 53/0462
                                                              95/115
(Continued)

*Primary Examiner* — Amber R Orlando
*Assistant Examiner* — Syed T Iqbal
(74) *Attorney, Agent, or Firm* — Millen White Zelano & Branigan, PC

(57) ABSTRACT

A process for producing and purifying a synthesis gas stream that contains CO- and $H_2$-produced from a hydrocarbon-containing feed in a gas production unit. $CO_2$ is separated from the synthesis gas stream and CO is cryogenically separated from the synthesis gas stream. $CO_2$ that makes up 5% to 30% by volume in the synthesis is reduced to less than 10 ppm by volume by temperature swing adsorption. The temperature swing adsorption takes place upstream of the cryogenic separation of CO. The $CO_2$ is adsorbed using a disordered adsorbent bed wherein the adsorbent is cooled by means of indirect heat transfer from the adsorbent to the heat transfer medium during adsorption and the adsorbent loaded with $CO_2$ is heated by indirect heat transfer from the heat transfer medium to the adsorbent to effect desorption of $CO_2$.

12 Claims, 1 Drawing Sheet

(51) Int. Cl.
*C01B 3/56* (2006.01)
*C10K 1/00* (2006.01)
*F25J 3/06* (2006.01)
*F25J 3/02* (2006.01)
*C10K 1/32* (2006.01)
*C10K 3/00* (2006.01)
*C01B 3/34* (2006.01)
*C01B 3/36* (2006.01)
*C01B 3/50* (2006.01)

(52) U.S. Cl.
CPC ............ *B01D 53/0462* (2013.01); *C01B 3/34* (2013.01); *C01B 3/36* (2013.01); *C01B 3/506* (2013.01); *C01B 3/56* (2013.01); *C10K 1/005* (2013.01); *C10K 1/32* (2013.01); *C10K 3/00* (2013.01); *B01D 2257/502* (2013.01); *B01D 2257/504* (2013.01); *C01B 2203/025* (2013.01); *C01B 2203/0205* (2013.01); *C01B 2203/042* (2013.01); *C01B 2203/046* (2013.01); *C01B 2203/047* (2013.01); *C01B 2203/0475* (2013.01); *C01B 2203/1241* (2013.01); *C01B 2203/146* (2013.01); *Y02C 10/08* (2013.01); *Y02C 10/12* (2013.01); *Y02P 20/152* (2015.11)

(58) Field of Classification Search
CPC .......... B01D 2256/20; B01D 2257/702; B01D 53/0462; B01D 53/0438; B01D 53/002; B01D 2257/502; C01B 2203/047; C01B 2203/0233; C01B 2203/025; C01B 2203/043; C01B 3/52; C01B 3/56; C01B 2203/0415; C01B 3/506; C01B 3/34; C01B 3/36; C01B 2203/146; C01B 2203/046; C01B 2203/0475; C01B 2203/1241; C01B 2203/0205; C01B 2203/042; F25J 3/0261; C10K 3/00; C10K 1/32; C10K 1/005; Y02C 10/12; Y02C 10/08
See application file for complete search history.

(56) References Cited

U.S. PATENT DOCUMENTS

2002/0194990 A1* 12/2002 Wegeng ............ H01M 8/04302
    95/114
2008/0314245 A1   12/2008 Hershkowitz et al.
2011/0207836 A1* 8/2011 Chen ................... B01D 53/002
    518/705

* cited by examiner

PROCESS FOR PRODUCING AND PURIFYING A SYNTHESIS GAS

The invention relates to a process for producing and purifying a synthesis gas comprising CO and also at least $H_2$, $CO_2$, $CH_4$, $H_2O$ and possibly $N_2$. The synthesis gas is produced by means of steam reforming or partial oxidation according to the prior art. To increase the CO content of the synthesis gas, $CO_2$ which is separated off from the synthesis gas can be recirculated as starting material before production of the gas.

Temperature swing adsorption (TSA) processes are known in the prior art. These have hitherto been used industrially mainly for removing trace components (less than 1% by volume) from gas mixtures. The TSA process is generally carried out using at least two vessels (adsorbers) which are filled with adsorptively active material (also referred to as adsorbent) and are operated alternately. While one vessel is in the adsorption mode, hot regenerating gas is passed through the other vessel which is thus heated by direct heat transfer, i.e. the regenerating gas contacts the adsorbent. The adsorption capacity of the adsorbent decreases with increasing temperature, and desorption of the retained components therefore occurs. The desorbed components are diluted by the regenerating gas and flushed from the adsorber. The use of regenerating gas additionally brings about a reduction in the partial pressure of the adsorbed component in the gas phase and thus promotes desorption of the retained trace components. The heating times and cooling times are usually limited by the amount of regenerating gas which is available or is able to be used and are typically in the region of a number of hours (normally more than three hours). This results in cycle times of usually significantly more than six hours.

In the cryogenic separation of a CO- and $H_2$-containing synthesis gas or oxo gas to produce a carbon monoxide or hydrogen product (here, for example, CO is condensed and separated off from $H_2$), carbon dioxide and water and possibly methanol have to be removed from the gas stream in order to prevent freezing-out of these components in the subsequent cold part of the plant. Absorptive processes, known as scrubs (for example an amine or Rectisol scrub), are mostly used for removing relatively large amounts of carbon dioxide. After the scrub, the synthesis gas usually still contains traces of carbon dioxide (e.g. less than 50 ppm by volume) and is saturated with the water- or methanol-containing scrubbing medium. Before the cryogenic liquefaction, carbon dioxide and water or methanol are therefore usually separated off by means of a TSA process in order to prevent freezing-out in the cryogenic separation.

EP 1 291 067 A2 describes a rapid TSA process based on a heat exchanger for removing traces of carbon dioxide and water. A process for the fine purification of synthesis gas is described in this.

It is not known in the prior art how a large amount of carbon dioxide and in particular also water or methanol can be separated off in this way (known as bulk separation). For this reason, 10% by volume, for example, of $CO_2$ in the synthesis gas from a reformer is usually removed in a conventional scrub down to less than 50 ppm per volume and the $CO_2$ content is then reduced to less than 0.1 ppm by volume in a conventional TSA (i.e. regeneration of the absorbent by means of direct heat transfer by treatment of the loaded absorbent with hot regenerating gas). Further disadvantages of the previous process (scrub and subsequent TSA) are the comparatively high capital costs, the comparatively high outlay in terms of apparatus and also the fact that two separate separation processes are involved.

The disadvantages of the previously known prior art indicated here are at least partly overcome by the invention described below. The features of the invention can be combined in any technically purposeful way, and the explanations in the following description and also features shown in the figures, which comprise supplementary embodiments of the invention, can also be employed for this purpose.

The invention provides for $CO_2$, which is present in a concentration in the range from 5% by volume to 30% by volume in the synthesis gas stream produced, to be depleted to less than 10 ppm by volume in the synthesis gas stream by means of a temperature swing adsorption upstream of the cryogenic isolation of CO, where $CO_2$ is adsorbed on an adsorbent (which is, in particular, present in the form of a disordered adsorbent bed) and the adsorbent is cooled by means of indirect heat transfer from the adsorbent to the heat transfer medium during adsorption of $CO_2$ and the adsorbent loaded with $CO_2$ is heated at least partly (in particularly solely) by indirect heat transfer from a fluid heat transfer medium to the absorbent to effect desorption of $CO_2$ (such a temperature swing adsorption is also referred to as RTSA (rapid temperature swing adsorption)).

The process of the invention is particularly suitable for separation of $CO_2$ from synthesis gas produced and having a concentration of from 5% by volume to 30% by volume. The $Co_2$-containing feed stream is brought to less than 10 ppm by volume, in particular less than 1 ppm by volume, more particularly less than 0.1 ppm by volume, by RTSA before the cryogenic isolation of CO. This means that at least 99.98% by volume of the $CO_2$ present in the synthesis gas is separated off. This high degree of removal is achieved by the adsorbent being cooled by means of the heat transfer medium during the adsorption of the $CO_2$, so that the adsorbent is not heated ever further by the heat of adsorption and the adsorption process can proceed efficiently at a relatively low temperature.

Many processes for synthesis gas production are known, e.g. steam reforming of hydrocarbon, in particular $CH_4$, or partial oxidation of natural gas. In addition, it is possible to produce the synthesis gas by auto thermal reforming or dry reforming. The process of the invention is not restricted to individual synthesis gas production processes, which also applies to combinations such as connection of the suitable processes in series or parallel, as long as production of synthesis gas is achieved.

The invention thus provides for the use of a rapid temperature swing adsorption (RTSA) process which, in particular, has comparatively short cycle times, preferably from 1 to 4 hours) for the removal of at least $CO_2$ and, in particular, also water and/or methanol. The heating and cooling of the adsorbent is effected indirectly here, preferably by means of a heat transfer medium or thermofluid separated by a dividing wall instead of a regenerating gas which flows directly over the adsorbent, as is the case in a conventional TSA process. It is thus possible to replace the above-mentioned scrub for $CO_2$ removal and also any downstream conventional TSA process by a single rapid TSA process or an appropriate plant having indirect heat transfer and in particular comparatively short cycle times.

In a further advantageous embodiment of the process, the carbon dioxide is separated from the synthesis gas stream under a gauge pressure in the range from 10 bar to 50 bar, preferably from 15 bar to 40 bar, in the rapid temperature swing adsorption (RTSA) according to the invention and, in particular, recirculated to synthesis gas production with small pressure drops, preferably solely pressure drops due to hydrodynamic effects.

Compared to the prior art, the process proposed here not only has the advantage that the above-mentioned scrub for bulk removal of $CO_2$ can be saved but the line pressure can additionally be maintained. Thus, the carbon dioxide can be recirculated without a large outlay, for example using comparatively few compression stages or even only by means of a blower, to synthesis gas production.

In a further advantageous embodiment of the process, the RTSA used according to the invention is followed by the conventional temperature swing adsorption process for fine purification of the synthesis gas by removal of $CO_2$ and, in particular, $H_2O$ and/or methanol.

Trace components can also be removed by the downstream TSA process. Thus, the upstream rapid TSA process can be designed solely for bulk removal, with any residual constituents carried over then being able to be separated off in the subsequent TSA process.

Particular preference is given to an embodiment of the invention in which $CO_2$ present in the synthesis gas is removed essentially completely to a concentration of less than 1 ppm by volume by means of the RTSA, and $CO_2$ still remaining in the synthesis gas is depleted, in particular to at least 0.1 ppm by volume or less than 0.1 ppm by volume, by means of a conventional TSA.

In such an arrangement (firstly RTSA then TSA), the adsorbent can advantageously be utilized better, so that the RTSA can be made smaller. In an RTSA which depletes $CO_2$ from, for example 10% by volume to 0.1 ppm by volume, part of the adsorbent would remain largely unutilized.

According to one further aspect of the invention, a plant is proposed which comprises at least:
  a unit for producing a synthesis gas stream;
  downstream of the synthesis gas production, at least one temperature swing adsorber having an adsorbent in the form of a disordered adsorbent bed in order to adsorb $CO_2$ (and also, in particular, $H_2O$ and/or methanol) from the synthesis gas stream, where the temperature swing adsorber is configured for regenerating the adsorbent by indirect heat transfer of the heat of a fluid heat transfer medium to the adsorbent, with $CO_2$ being desorbed from the adsorber,
  downstream of the temperature swing adsorber, a cryogenic separation unit which is configured for separating carbon monoxide cryogenically (e.g. by condensation) from the synthesis gas stream;
  a return line (in particular with blower) from the temperature swing adsorber to synthesis gas production, which is configured for recirculating the desorbed $CO_2$ to synthesis gas production; and
  in particular downstream of the temperature swing adsorber, a pressure swing adsorber for separating hydrogen from the synthesis gas stream.

This synthesis gas plant is preferably equipped for carrying out the above-mentioned process. A gas scrub, for example an amine scrub or a Rectisol scrub, is again not necessary or in particular not explicitly provided. Rather, the above-mentioned temperature swing adsorber replaces the gas scrubbing unit (see above). The carbon dioxide is fed as starting material to synthesis gas production by means of the return line. In contrast to previously known plants, no complicated compression stages are necessary here since the $CO_2$ can be recovered at high pressure (see above) in said temperature swing adsorber. Thus, only pressure drops due to hydrodynamic effects (for example pipe friction losses) occur and these can be compensated for by means of a (simple) blower. The recirculation is thus simplified and made more economical. In a further advantageous embodiment of the synthesis gas plant, a conventional temperature swing adsorber in which the adsorbent is treated with a hot regenerating gas (see above) to effect regeneration is installed downstream of the above-mentioned temperature swing adsorber. Trace amounts of $CO_2$ can be removed by means of this downstream, simple temperature swing adsorber for carrying out the conventional TSA process. Here, said temperature swing adsorber can be configured solely for bulk removal, with any residual constituents carried over then being able to be separated off in the subsequent conventional temperature swing adsorber.

The process proposed here and the synthesis gas plant proposed here make it possible to produce synthesis gas more economically without a gas scrub being necessary.

The above-described invention is explained in detail below in the light of the relevant technical background with reference to the accompanying drawings which show preferred embodiments. The invention is not restricted in any way by the purely schematic drawings, and it may be stated that the drawings are not to scale and are not suitable for defining size ratios.

Figure 1:
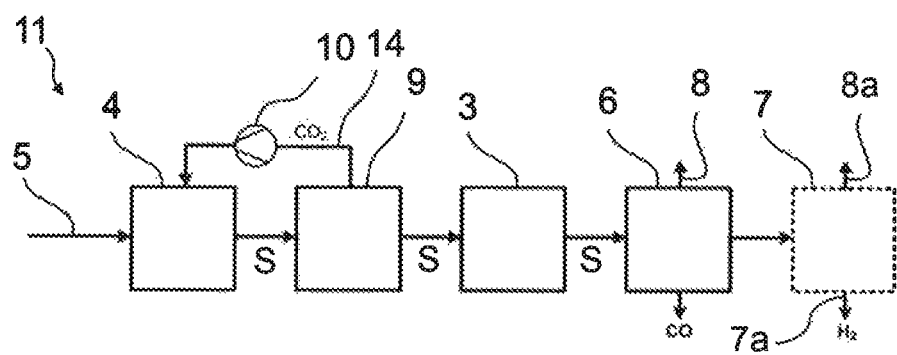
FIG. 1 is: a block diagram of a process known from the prior art for producing/purifying a synthesis gas.

FIG. 1 shows a conventional synthesis gas plant 11 in which a hydrocarbon-containing feed (e.g. natural gas) is firstly converted in a unit for synthesis gas production into a synthesis gas stream S containing at least CO and $H_2$ and also $CH_4$ and possibly traces of $N_2$. The synthesis gas S is fed to a scrub 9 in which $CO_2$ and water are separated off. Trace amounts of $CO_2$ and possibly water or methanol are subsequently separated off from the synthesis gas stream S in a conventional temperature swing adsorber 3 in which a hot regenerating gas is contacted with the adsorbent in order to carry out direct heat transfer to the adsorbent so as to regenerate the adsorbent. Finally, carbon monoxide and possibly a tailgas 8 (containing, for example, CO, $CH_4$ and possibly $H_2$ and $N_2$) are separated off from the synthesis gas stream S in a cryogenic separation unit (also referred to as cold box) 6. Downstream, furthermore, hydrogen 7a and a tailgas 8a (containing, for example, CO, $CH_4$ and possibly $H_2$ and $N_2$) are separated off from the synthesis gas stream S by pressure swing adsorption in a pressure swing adsorber 7. Furthermore, the carbon dioxide which has been separated off in the scrub 9 is recirculated via the return line 14 to the synthesis gas production 4, for which a multistage compressor 10 is necessary because of the pressure drop required for the scrub 9. By means of this conventional synthesis gas plant, the concentration of carbon dioxide in the synthesis gas stream is decreased from 10% by volume to less than 50 ppm by volume.

Figure 2:
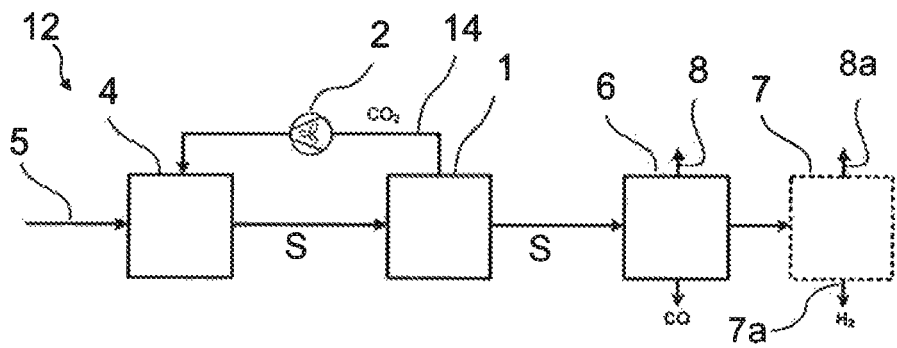
FIG. 2 is: a block diagram of a first embodiment of the process of the invention or the synthesis gas plant of the invention.

FIG. 2 shows a first embodiment of a process according to the invention or a corresponding plant 12 as per the above description. Here, the scrub 9 and the conventional temperature swing adsorber 3 (see FIG. 1) are replaced by a rapid temperature swing adsorber 1 which is alone able to separate off a large amount of carbon dioxide and water. In the temperature swing adsorption 1, the adsorbent in the form of a disordered bed is regenerated by being heated by indirect heat transfer. The heat is provided here by a fluid heat transfer medium which is spatially separated from the adsorbent. The carbon dioxide recovered in this way at a high gas pressure can thus be recirculated immediately, with merely a blower 2 compensating for the pressure drop due solely to hydrodynamic effects. By means of this process, the concentration of carbon dioxide in the synthesis gas stream is decreased from, for example, 5% by volume to 30% by volume to less than 10 ppm by volume, in particular to at least 0.1 ppm by volume or less than 0.1 ppm by volume.

Figure 3:
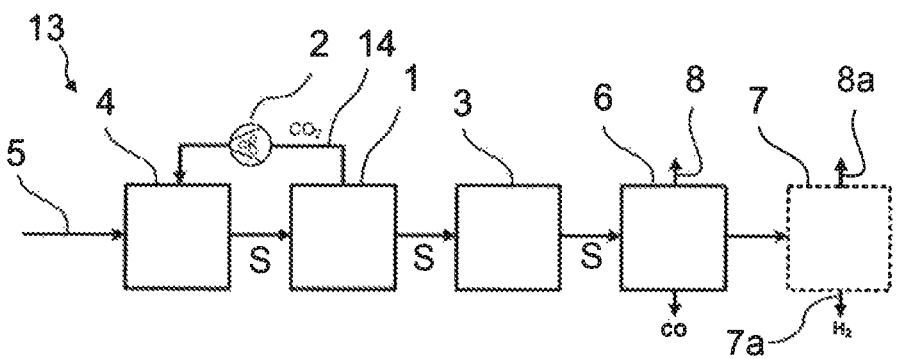
FIG. 3 is: a block diagram of a second embodiment of the process of the invention or the synthesis gas plant of the invention.

FIG. 3 shows a second embodiment of a process according to the invention or a synthesis gas plant 13 according to the invention which resembles the synthesis gas plant 12 in FIG. 2. Here, the rapid temperature swing adsorber 1 is followed by an additional conventional temperature swing adsorber 3 which is regenerated by means of direct heat transfer (see above) and assumes the task of removing trace amounts of $CO_2$ and possibly water.

| List of reference symbols | |
|---|---|
| 1 | Temperature swing adsorber (RTSA) |
| 2 | Blower |
| 3 | Temperature swing adsorber (TSA) |
| 4 | Reactor or synthesis gas production |
| 5 | Feed |
| 6 | Cold box or cryogenic separation unit |
| 7 | Pressure swing adsorber |
| 7a | Crude hydrogen stream |
| 8, 8a | Tailgas |
| 9 | Scrub for removal of $CO_2$ |
| 10 | Multistage compressor |
| 11 | Conventional synthesis gas plant |
| 12 | First synthesis gas plant |
| 13 | Second synthesis gas plant |
| 14 | Return line |
| S | Synthesis gas stream |

The invention claimed is:

1. A process for producing and purifying a synthesis gas stream, comprising:
   producing a CO- and $H_2$-containing synthesis gas stream from a hydrocarbon-containing feed in a gas production unit,
   separating at least $CO_2$ from the synthesis gas stream, and
   separating CO from the synthesis gas stream by cryogenic separation,
   wherein, prior to said separating of at least $CO_2$, $CO_2$ is present in said synthesis gas stream in a concentration in the range from 5% by volume to 30% by volume, and in said separating of at least $CO_2$, $CO_2$ is depleted to less than 10 ppm by volume in the synthesis gas stream by means of a first temperature swing adsorption upstream of said cryogenic separation,
   wherein, in said first temperature swing adsorption, $CO_2$ is adsorbed on an adsorbent and the adsorbent is cooled by means of indirect heat transfer from the adsorbent to a heat transfer medium during adsorption of $CO_2$, and the adsorbent loaded with $CO_2$ is heated at least partly by indirect heat transfer from a heat transfer medium to the adsorbent to effect desorption of $CO_2$; and
   in said first temperature swing adsorption $CO_2$ is desorbed at a pressure in the range from 5 bar to 90 bar, and recirculated to the gas production unit as starting material for synthesis gas production.

2. The process as claimed in claim 1, wherein the adsorbent is configured as a disordered adsorbent bed.

3. The process as claimed in claim 1, wherein the $CO_2$ is depleted by said first temperature swing adsorption to less than 1 ppm by volume in said synthesis gas.

4. The process as claimed in claim 1, wherein the synthesis gas stream is introduced under a pressure in the range from 10 to 50 bar into the temperature swing adsorption.

5. The process as claimed in claim 1, further comprising performing a second temperature swing adsorption, downstream of the first temperature swing adsorption, in order to separate $CO_2$ still present in the synthesis gas stream from the synthesis gas stream, wherein is said second temperature swing adsorption $CO_2$ is adsorbed on an adsorbent and the adsorbent loaded with $CO_2$ is treated with a regenerating gas in such a way that heat of the regenerating gas is transferred directly to the absorbent to effect desorption of $CO_2$.

6. The process as claimed in claim 3, wherein the $CO_2$ in said synthesis gas is depleted by said first temperature swing adsorption to less than 0.1 ppm by volume.

7. The process as claimed in claim 1, wherein the adsorbed $CO_2$ is desorbed at a pressure in the range from 15 bar to 60 bar.

8. The process as claimed in claim 1, wherein the synthesis gas stream is introduced into the temperature swing adsorption under a pressure in the range from 15 to 40 bar.

9. The process as claimed in claim 1, wherein said separating of at least $CO_2$ does not involve the use a scrubbing operation.

10. The process according to claim 1, wherein the indirect cooling and heating of the adsorbent in said first temperature swing adsorption is provided by a heat transfer medium or thermofluid separated from the adsorbent by a dividing wall.

11. The process according to claim 5, wherein in said first temperature swing adsorption $CO_2$ present in the synthesis gas is depleted to a concentration of less than 1 ppm by volume, and in said second temperature swing adsorption $CO_2$ still remaining in the synthesis gas is depleted to less than 0.1 ppm by volume.

12. The process according to claim 1, further comprising, downstream of the first temperature swing adsorber, separating hydrogen from the synthesis gas stream by a pressure swing adsorber.

* * * * *